(12) United States Patent
Yufuku et al.

(10) Patent No.: US 7,994,733 B2
(45) Date of Patent: Aug. 9, 2011

(54) DISCHARGE LAMP LIGHTING DEVICE AND LIGHT FIXTURE

(75) Inventors: Akira Yufuku, Hirakata (JP); Takeshi Goriki, Yawata (JP); Jun Konishi, Himeji (JP)

(73) Assignees: Panasonic Electric Works Co., Ltd., Osaka (JP); Ikeda Electric Co., Ltd., Hyogo (JP)

( * ) Notice: Subject to any disclaimer, the term of this patent is extended or adjusted under 35 U.S.C. 154(b) by 358 days.

(21) Appl. No.: 12/306,570

(22) PCT Filed: Mar. 26, 2007

(86) PCT No.: PCT/JP2007/056234
§ 371 (c)(1),
(2), (4) Date: Dec. 24, 2008

(87) PCT Pub. No.: WO2008/001519
PCT Pub. Date: Jan. 3, 2008

(65) Prior Publication Data
US 2009/0236999 A1    Sep. 24, 2009

(30) Foreign Application Priority Data

Jun. 27, 2006 (JP) .................. 2006-176001

(51) Int. Cl.
*H05B 37/02* (2006.01)
(52) U.S. Cl. ............ 315/291; 315/307; 315/DIG. 7
(58) Field of Classification Search .............. 315/209 R, 315/224, 225, 227 R, 247, 291, 307, 308, 315/361, DIG. 7
See application file for complete search history.

(56) References Cited

U.S. PATENT DOCUMENTS

| | | | |
|---|---|---|---|
| 6,437,515 B1 * | 8/2002 | Kamoi et al. | 315/209 R |
| 6,963,176 B2 * | 11/2005 | Onishi et al. | 315/291 |
| 2004/0183472 A1 * | 9/2004 | Kamoi et al. | 315/291 |
| 2007/0210727 A1 | 9/2007 | Sun et al. | |
| 2008/0030143 A1 | 2/2008 | Goriki et al. | |
| 2008/0048586 A1 | 2/2008 | Hasegawa et al. | |
| 2008/0143270 A1 | 6/2008 | Sun et al. | |
| 2008/0157693 A1 | 7/2008 | Yamamoto et al. | |

FOREIGN PATENT DOCUMENTS

| | | |
|---|---|---|
| EP | 0408121 | 1/1991 |
| JP | 3-030291 | 2/1991 |
| JP | 3-30291 | 2/1991 |
| JP | 3-102798 | 4/1991 |
| JP | 8-124687 | 5/1996 |
| JP | 08-124687 | 5/1996 |
| JP | 2004-265707 | 9/2004 |

OTHER PUBLICATIONS

English language Abstract of JP 8-124687, May 17, 1996.
English language Abstract of JP 3-30291, Feb. 8, 1991.
English language Abstract of JP 2004-265707, Sep. 24, 2004.
English language Abstract of JP 3-102798, Apr. 30, 1991.
Japanese Office Action, mailed Oct. 19, 2010.

* cited by examiner

*Primary Examiner* — Jacob Y Choi
*Assistant Examiner* — Jimmy T Vu
(74) *Attorney, Agent, or Firm* — Greenblum & Bernstein, P.L.C.

(57) ABSTRACT

When the starting of the discharge lamp has been detected at least once, the control circuit increases the number of repetitions of a period while the high frequency voltage and the square wave voltage are being outputted alternately. In such a way, in the discharge lamp lighting device that alternately generates the high frequency voltage and the square wave voltage at the time of starting, sure startability is ensured.

8 Claims, 7 Drawing Sheets

DISCHARGE LAMP LIGHTING DEVICE AND LIGHT FIXTURE

TECHNICAL FIELD

The present invention relates to a discharge lamp lighting device for lighting a high-intensity discharge lamp, and to a light fixture using the discharge lamp lighting device.

BACKGROUND ART

Figure 6:
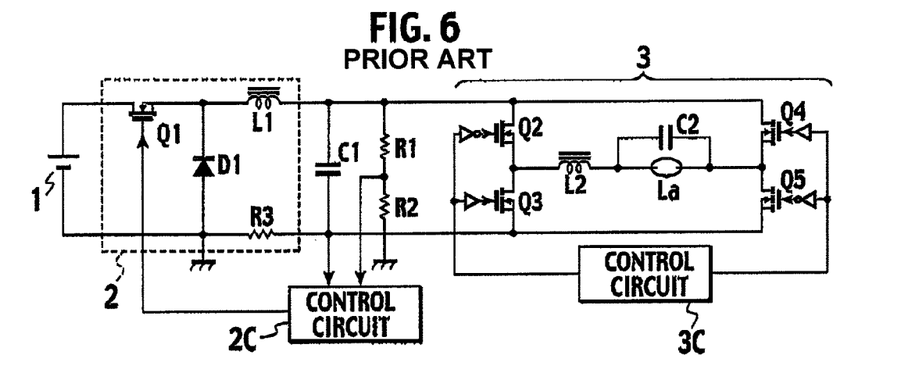
FIG. 6 is a circuit diagram showing a configuration of a conventional example.

A high-intensity discharge lamp can obtain a high-brightness luminous flux output by means of a compact shape, and is close to point-source light, in which a light distribution control is easy. Accordingly, the high-intensity discharge lamp has come recently to be used as an alternative of an incandescent lamp or a halogen lamp. In general, it is considered that a pulse of a voltage as high as several kilovolts is required for a voltage necessary to start the high-intensity discharge lamp. As shown in FIG. 6, this high-intensity discharge lamp has a circuit configuration that is typical as a conventional example.

Reference numeral 1 denotes a direct-current power supply, reference numeral 2 denotes a DC/DC converter, and reference numeral 3 denotes a DC/AC inverter. An inverter L2 and a capacitor C2 compose a resonant circuit. Moreover, reference numeral 2C denotes a control circuit for the DC/DC converter 2, and reference numeral 3C denotes a control circuit for the DC/AC inverter 3.

The DC/DC converter 2 is composed of a switching element Q1, a diode D1 and an inductor L1. The DC/DC converter 2 charges, to a smoothing capacitor C1, a voltage dropped by performing voltage conversion for a current from the direct-current power supply 1. A both-end voltage of the capacitor C1 is substantially equal to a lamp voltage, and is also easy to detect. Therefore, the control circuit 2C detects the voltage of the capacitor C1 in place of detecting the lamp voltage, and outputs a drive signal of the switching element Q1 in response to a value of the detected voltage. Note that the DC/DC converter 2 in this conventional example is a so-called step-down chopper circuit, and operations thereof are very common, and accordingly, a description of the operations is omitted.

Next, the DC/AC inverter 3 is a full-bridge circuit composed of switching elements Q2 to Q5. A discharge lamp La is connected to an alternating-current output side of the DC/AC inverter 3 through a starting circuit composed of the resonant circuit formed of the resonant inductor L2 and the resonant capacitor C2.

The DC/AC inverter 3 is controlled by the control circuit 3C. The control circuit 3C is composed, for example, of a controlling microcomputer. Operations of the control circuit 3C are described with reference to a flowchart of FIG. 7, and operations of the switching elements Q2 to Q5 and a change of the lamp voltage are described with reference to FIG. 8.

Figure 7:
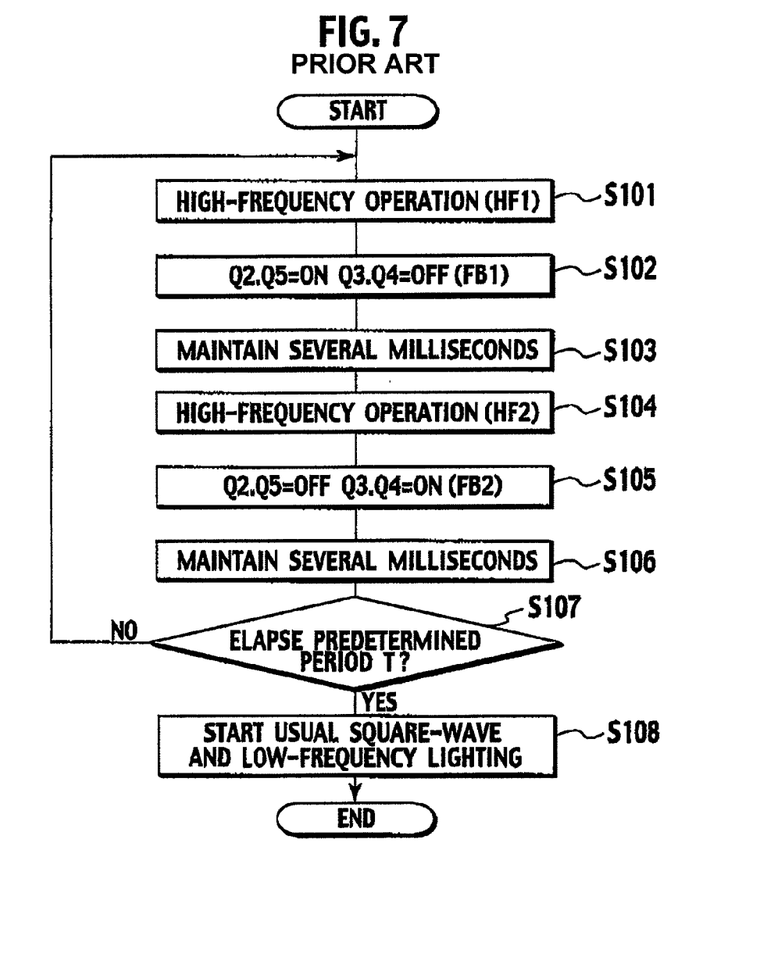
FIG. 7 is a flowchart showing operations of the conventional example.

First, during a period from the time of starting the discharge lamp La to the point of time when a predetermined time T elapses, as shown in FIG. 7, the control circuit 3C controls the operations of the DC/AC inverter 3 to pass through a high-frequency operation (Step S101 (HF1)), a square-wave operation (Step S102 (FB1)), a high-frequency operation (Step S104 (HF2)) and a square-wave operation (Step S105 (FB2)), and then to return to the high-frequency operation (HF1).

In the high-frequency operation (HF1), the control circuit 3C is allowed to perform an alternate switching operation at a high frequency between a state where the switching elements Q2 and Q5 are turned on and the switching elements Q3 and Q4 are turned off and a state where the switching elements Q2 and Q5 are turned off and the switching elements Q3 and Q4 are turned on. In such a way, the DC/AC inverter 3 generates a high-frequency and high-voltage pulse by the inductor L2 and resonant capacitor C2 of the resonant circuit.

The square-wave operation (FB1) is an operation in which the control circuit 3C is allowed to turn on the switching elements Q2 and Q5 and to turn off the switching elements Q3 and Q4. This square-wave operation (FB1) is continued for a period of several milliseconds in Step S103.

In the high-frequency operation (HF2) performed after the square-wave operation (FB1) is continued for several milliseconds, the control circuit 3C is allowed to perform an alternate switching operation at the high frequency between a state where the switching elements Q2 and Q5 are turned on and the switching elements Q3 and Q4 are turned off and a state where the switching elements Q2 and Q5 are turned off and the switching elements Q3 and Q4 are turned on. In such a way, the DC/AC inverter 3 generates a high-frequency and high-voltage pulse by the resonant inductor L2 and resonant capacitor C2 of the resonant circuit.

In the square-wave operation (FB2), the control circuit 3C is allowed to turn on the switching elements Q2 and Q5 and to turn off the switching elements Q3 and Q4. This square-wave operation (FB2) is continued for a period of several milliseconds in Step S106.

Figure 8:
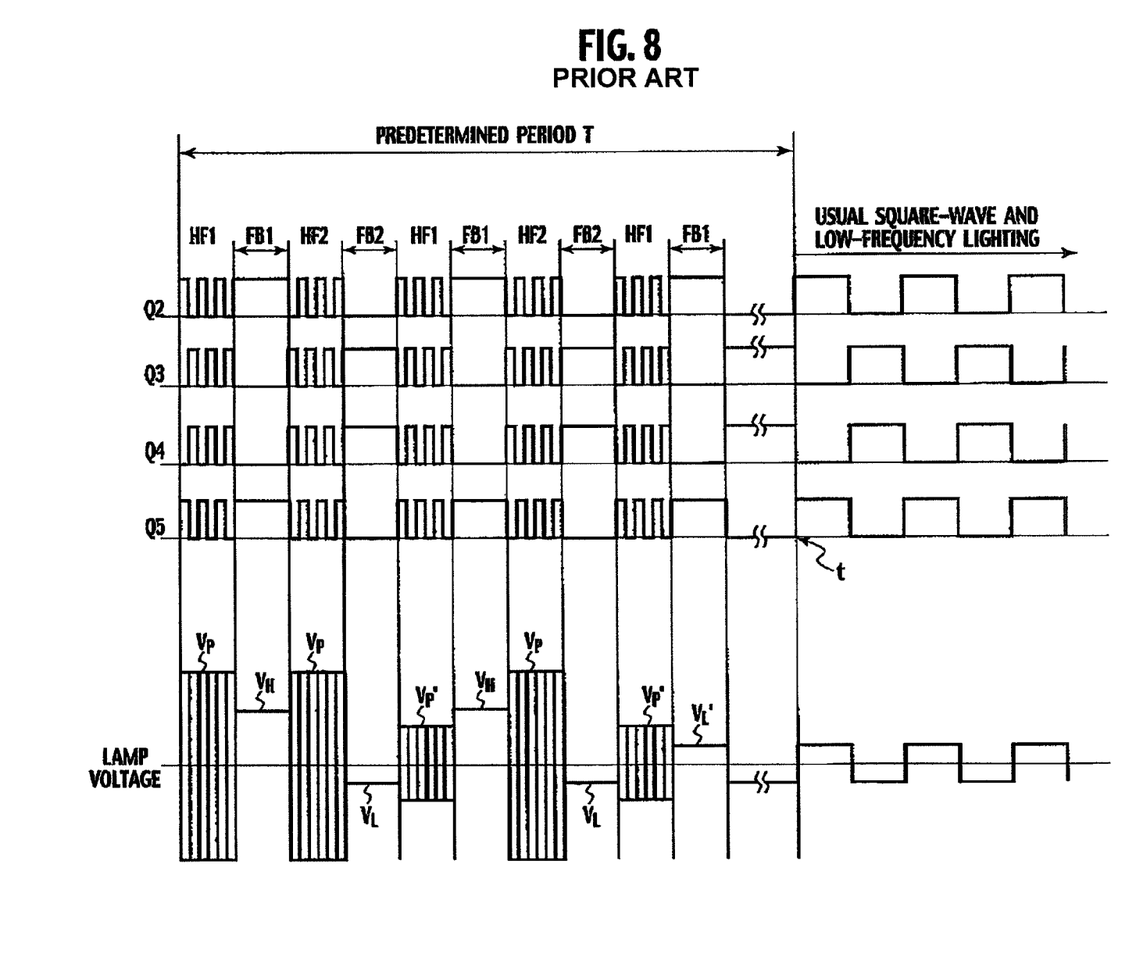
FIG. 8 is a waveform chart for explaining the operations of the conventional example.

The control circuit 3C that operates in accordance with such a flowchart drives the switching elements Q2 to Q5 as shown in FIG. 8. In such a way, the control circuit 3C allows the discharge lamp La to cause a dielectric breakdown by high-frequency pulse voltages VP made by the high-frequency operations HF1 and HF2, and during subsequent periods while the square-wave operations FB1 and FB2 are being performed, allows discharge of the discharge lamp La to shift from glow discharge to arc discharge, and thereby starts to light the discharge lamp La.

At the high-frequency operations HF1 and HF2, in the case where the discharge lamp La is not lighted, the high-frequency pulse voltages reach a high voltage value VP, and in the case where the discharge lamp La is lighted, the high-frequency pulse voltages fall to a low voltage value VP'. The reason why the high-voltage pulse voltages fall to the low value when the discharge lamp La is lighted is that a lamp current is restricted by the resonant inductor L2. Moreover, during the periods of the square-wave operations FB1 and FB2, in the case where the discharge lamp La is not lighted, the lamp voltages reach a high voltage value VH, and in the case where the discharge lamp La is lighted, the lamp voltages fall to a low voltage value VL. The above-described operations are repeated during the predetermined period T, and after the point of time t when the predetermined time T elapses, the operations shift to usual low-frequency and square-wave lighting.

However, in the technology shown in FIG. 8, there occurs fading of the discharge lamp La, in which, though the discharge lamp La is lighted in the first square-wave operation FB2, the discharge lamp La is not lighted in the subsequent period of the high-frequency operation HF1.

In Japanese Patent Laid-Open Publication No. 2004-265707, it is described that, at the time of starting a high-brightness discharge lamp, a section in which a high voltage is applied by a resonant operation and a section in which a low-frequency square wave voltage is applied are repeated alternately. In accordance with this technology, such a dielectric breakdown between the electrodes in the section in which the high voltage is applied by the resonant operation is ensured, and the shifting from the glow discharge to the arc discharge is ensured by the section in which the low-frequency square wave voltage is applied.

In the technology described in Japanese Patent Laid-open Publication No. 2004-265707, also after the discharge lamp was lighted once, such a generation period of the high frequency voltage and such a generation period of the square wave voltage are repeated alternately. In this case, since the resonant inductor L2 has a high impedance with respect to the high frequency, the resonant inductor L2 becomes a large current restriction element during the generation period of the high frequency voltage, causing the fading of the discharge lamp to be induced.

The present invention has been made in consideration for the points as described above. It is an object of the present invention to ensure secure startability of the discharge lamp in the discharge lamp lighting device that alternately generates the high frequency voltage and the square wave voltage at the time of starting the discharge lamp.

DISCLOSURE OF THE INVENTION

Figure 1:
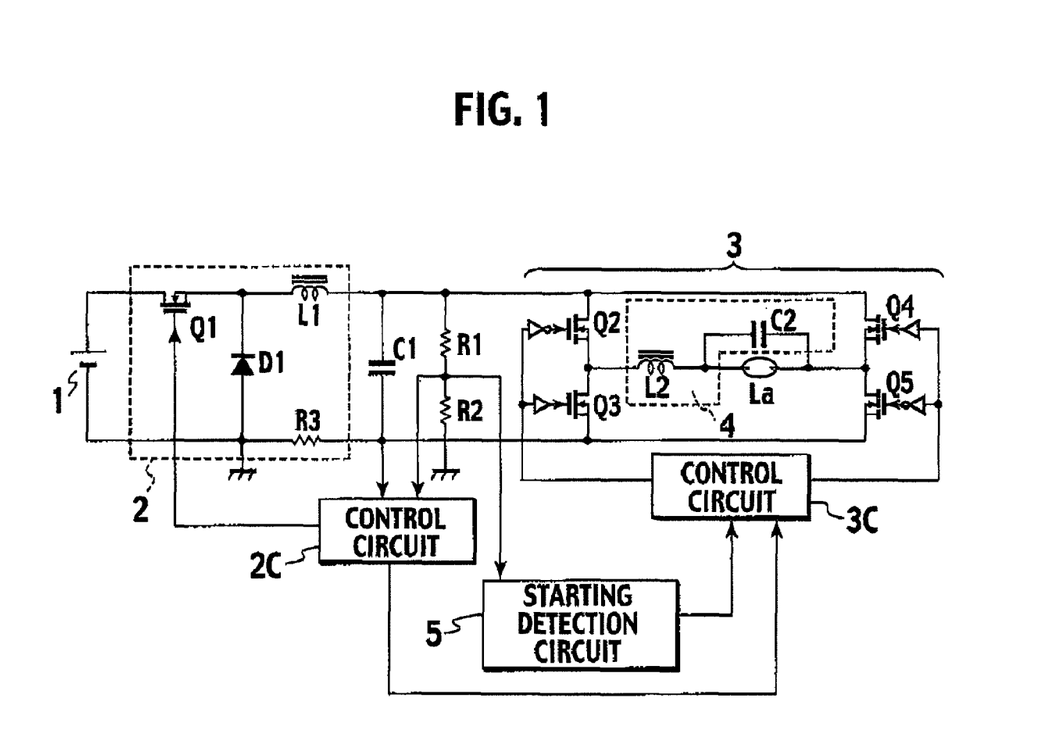
FIG. 1 is a circuit diagram showing a configuration of a first embodiment of the present invention.

As shown in FIG. 1, a discharge lamp lighting device to which the present invention is applied has: a DC/DC converter 2 that converts a power supply voltage of a direct-current power supply 1 into a desired direct current voltage; a smoothing capacitor C1 that smoothes an output of the direct current voltage from the DC/DC converter 2; a DC/AC inverter 3 that converts, into an alternating current voltage, the direct current voltage smoothed by the smoothing capacitor C1; and a starting circuit 4 that is provided with a resonant circuit composed of at least one capacitor C2 and at least one inductor L2 and supplies an output of the DC/AC inverter 3 to a discharge lamp La.

Figure 2:
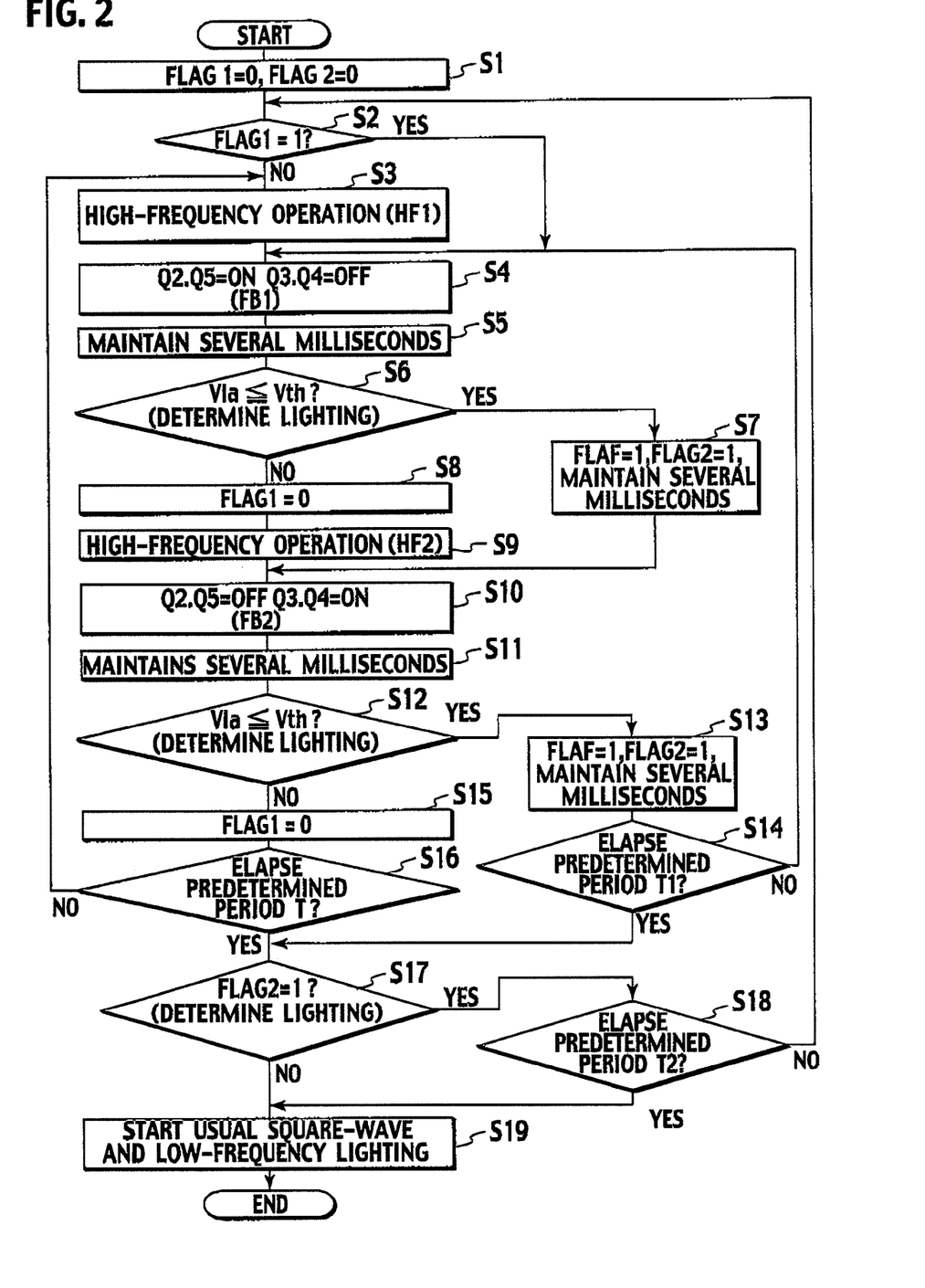
FIG. 2 is a flowchart showing operations of the first embodiment of the present invention.
Figure 3:
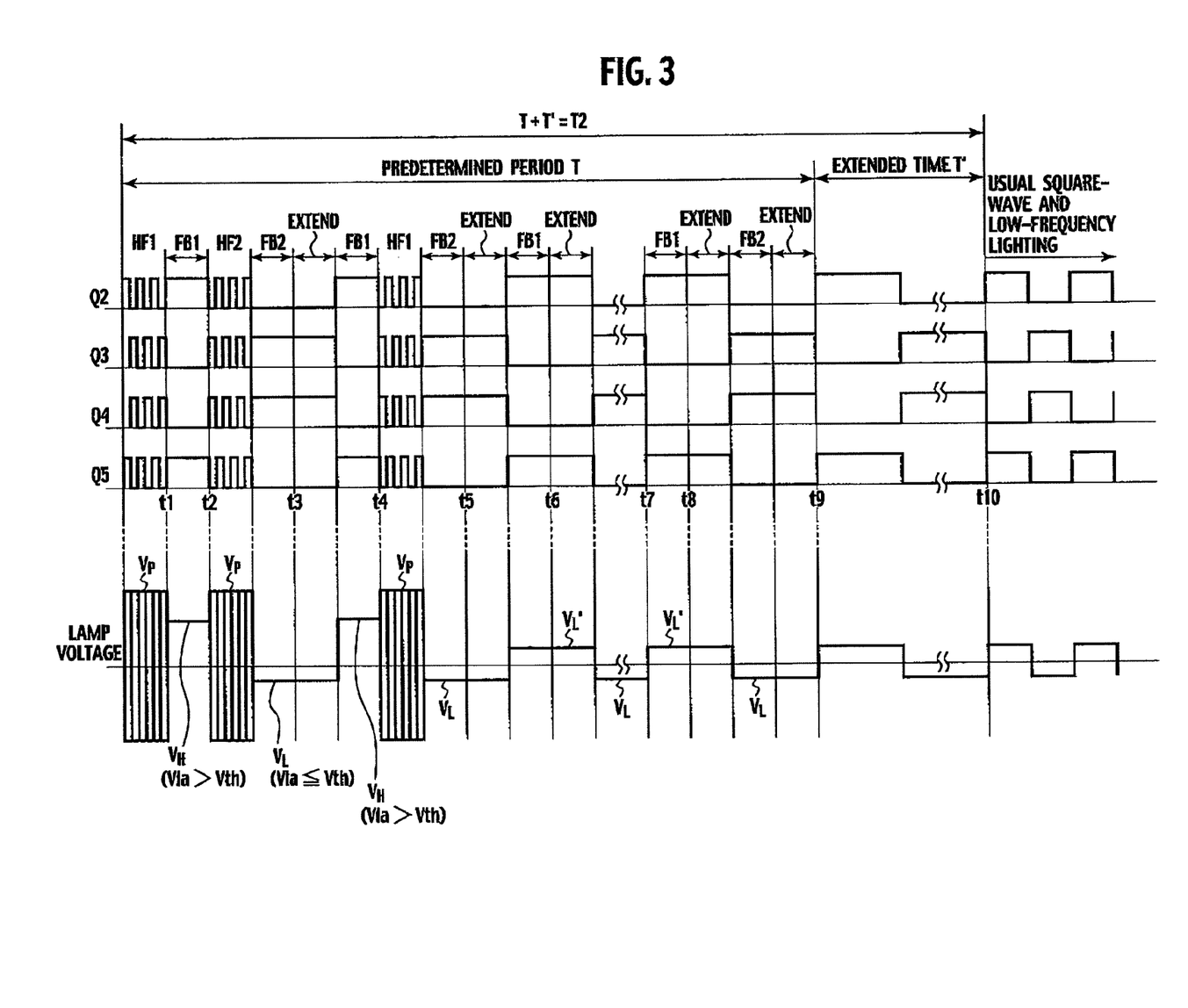
FIG. 3 is a waveform chart for explaining the operations of the first embodiment of the present invention.

As shown in FIG. 2 and FIG. 3, at the time of starting the discharge lamp La, the discharge lamp lighting device alternately repeats operations HF1 and HF2 for outputting high frequency voltages, in which the resonant circuit performs resonant operations, and operations FB1 and FB2 for outputting square wave voltages. At the time of lighting the discharge lamp La, the discharge lamp lighting device applies a low-frequency square wave voltage to the discharge lamp La through the starting circuit 4.

In order to solve such problems as described above, the discharge lamp lighting device is characterized in the following manner. Specifically, the discharge lamp lighting device includes: a starting detection circuit 5 that detects the starting of the discharge lamp La during the periods FB1 and FB2 while the square wave voltages are being outputted; and a control circuit 3C that stops the high frequency voltage or lowers a frequency of the high frequency voltage in the case where the starting of the discharge lamp La is detected. In the case where the starting of the discharge lamp La has been detected at least once, the control circuit 3c makes a setting so that the number of repetitions of a period while the high frequency voltage and the square wave voltage are being outputted alternately can be increased.

BEST MODE FOR CARRYING OUT THE INVENTION

First Embodiment

A circuit configuration of a discharge lamp lighting device of a first embodiment of the present invention is shown in FIG. 1. This discharge lamp lighting device is composed of: a direct-current power supply 1; a DC/DC converter 2 that converts a power supply voltage of the direct-current power supply 1 into a desired direct current voltage; a smoothing capacitor C1 that smoothes an output of the direct current voltage from the DC/DC converter 2; a DC/AC inverter 3 that converts, into an alternating current voltage, the direct current voltage smoothed by the smoothing capacitor C1; a starting circuit 4 that has a resonant circuit composed of a resonant capacitor C2 and a resonant inductor L2, which contribute to a resonant operation, and supplies an output of the DC/AC inverter 3 to a discharge lamp La; a control circuit 2C that controls the DC/DC converter 2; and a control circuit 3C that controls the DC/AC inverter 3.

In terms of a circuit configuration, the discharge lamp lighting device shown in FIG. 1 is different from the discharge lamp lighting device shown in FIG. 6 in including a starting detection circuit 5 of the discharge lamp La. The starting detection circuit 5 is connected to a node between divider resistors R1 and R2 connected in parallel to the smoothing capacitor C1. The starting detection circuit 5 reads a potential of the node between the divider resistors R1 and R2, and outputs the potential to the control circuit 3C.

Reference numeral 1 denotes the direct-current power supply, reference numeral 2 denotes the DC/DC converter, and reference numeral 3 denotes the DC/AC inverter. The inductor L2 and the capacitor C2 compose the resonant circuit. Moreover, reference numeral 2C denotes the control circuit for the DC/DC converter 2, and reference numeral 3C denotes the control circuit for the DC/AC inverter 3.

The DC/DC converter 2 is composed of a switching element Q1, a diode D1 and an inductor L1. The DC/DC converter 2 charges, to a smoothing capacitor C1, a voltage dropped by performing voltage conversion for a current from the direct-current power supply 1. A both-end voltage of the capacitor C1 is substantially equal to a lamp voltage, and is also easy to detect. Therefore, the control circuit 2C detects the voltage of the capacitor C1 in place of detecting the lamp voltage, and outputs a drive signal of the switching element Q1 in response to a value of the detected voltage. Note that the DC/DC converter 2 in this conventional example is a so-called step-down chopper circuit, and operations thereof are very common, and accordingly, a description of the operations is omitted.

The DC/AC inverter 3 is a full-bridge circuit composed of switching elements Q2 to Q5. A discharge lamp La is connected to an alternating-current output side of the DC/AC inverter 3 through a starting circuit composed of the resonant circuit formed of the resonant inductor L2 and the resonant capacitor C2.

In a state where the discharge lamp La is not lighted, the control circuit 2C outputs the drive signal to the switching element Q1 of the DC/DC converter 2. This drive signal is, for example, a square wave signal with a frequency of several ten kilohertz and a duty ratio of several ten percents. The frequency and duty ratio of this drive signal are decided by the control circuit 2C based on a voltage V1a of the smoothing capacitor C1.

The voltage V1a of the smoothing capacitor C1 is converted into a high-frequency pulse voltage in such a manner that the Dc/AC inverter 3 is allowed to perform a high-frequency switching operation by the control circuit 3C. Specifically, at a high frequency, the control circuit 3C alternately repeats a state where the switching elements Q2 and Q5 are turned on and the switching elements Q3 and Q4 are turned off and a state where the switching elements Q2 and Q5 are turned off and the switching elements Q3 and Q4 are turned on. In such a way, the control circuit 3C applies the high-frequency pulse voltage to the discharge lamp La by the resonant circuit L2 and the capacitor C2.

In this embodiment, output frequencies of drive signals of the switching elements Q2 to Q5, which are outputted from the control circuit 3C, are set in a range from several ten to several hundred kilohertz. The control circuit 3C drives the switching elements Q2 to Q5 approximately at a resonant frequency of the resonant circuit L2 and C2, and thereby obtains such a high-voltage and high-frequency pulse voltage.

FIG. 2 shows a control flowchart for the discharge lamp lighting device, and FIG. 3 shows operation waveforms of the respective portions in the discharge lamp lighting device.

First, as shown in FIG. 2, the control circuit 3C initializes a lighting flag: FLAG1 and a lighting history flag: FLAG2 in Step S1 immediately after starting the discharge lamp lighting device. Note that Step S1 is performed every time of starting the discharge lamp lighting device, and is not performed after the discharge lamp lighting device is started.

The lighting flag (FLAG1) indicates a state as to whether or not the discharge lamp La is lighted. A value of this lighting flag is changed by the control circuit 3C. For example, a state where the discharge lamp La is lighted is represented by "1" as a value of the lighting flag, and a state where the discharge lamp La is not lighted is represented by "0" as a value of the lighting flag. The lighting history flag (FLAG2) indicates a state as to whether or not the discharge lamp La has been started at least once since power was turned on in the discharge lamp lighting device. This lighting history flag (FLAG2) is changed by the control circuit 3C. For example, a state where the discharge lamp La has been started at least once since the respective flags (FLAG1, FLAG2) were initialized in Step S1 is represented by "1" as a value of the lighting history flag, and a state where the discharge lamp La is not lighted at all thereafter is represented by "0" as a value of the lighting history flag.

In Step S2, the control circuit 3C determines the value of the lighting flag (FLAG1). If the lighting flag (FLAG1) is equal to 1 (lighted), then the control circuit 3C advances the processing to Step S4 without performing a control for a high-frequency operation (HF1) of Step S3. Meanwhile, if FLAG1 is equal to 0 (not lighted), then the control circuit 3C starts the high-frequency operation (HF1) of Step S3.

In this high-frequency operation (HF1), as shown by a period until a time t1 of FIG. 3, the control circuit 3C performs an alternate switching operation at the high frequency between the state where the switching elements Q2 and Q5 are turned on and the switching elements Q3 and Q4 are turned off and the state where the switching elements Q2 and Q5 are turned off and the switching elements Q3 and Q4 are turned on. In such a way, as shown in FIG. 3, by the resonant inductor L2 and resonant capacitor C2 of the resonant circuit, the control circuit 3c realizes such a high-frequency operation period HF1 while a high-frequency and high-voltage pulse VP is being generated.

When the high-frequency operation period HF1 is ended, next, the control circuit 3C proceeds to a square-wave operation FB1 of Step S4, and as shown at the time t1 of FIG. 3, switches on the switching elements Q2 and Q5, and switches off the switching elements Q3 and Q4. Thereafter, in Step S5, the control circuit 3C maintains a state of the square-wave operation FB1 for several milliseconds (time t1 to time t2 in FIG. 3).

Next, in Step S6, the discharge lamp lighting device detects a lighting state of the discharge lamp La by the starting detection circuit 5, and determines by the control circuit 3C whether or not the discharge lamp La is lighted. In such processing for determining by the control circuit 3C whether or not the discharge lamp La is lighted, it is determined that the discharge lamp La is lighted if the voltage V1a of the smoothing capacitor C1 is equal to or less than a predetermined threshold value (defined as Vth), and it is determined that the discharge lamp La is not lighted if the voltage V1a exceeds the threshold value. At this time, the control circuit 3C receives voltage information (V1a) of the smoothing capacitor C1 from the control circuit 2C.

In the case where it is determined that the discharge lamp La is lighted, then in Step S7, the control circuit 3C sets the lighting flag (FLAG1) to be equal to 1, sets the lighting history flag (FLAG2) to be equal to 1, waits for several milliseconds, and advances the processing to Step S10. Specifically, the control circuit 3C skips a high-frequency operation HF2, and proceeds to a square-wave operation FB2 of Step S10.

In the case where it is determined in Step S6 that the discharge lamp La is not lighted, the control circuit 3C sets the lighting flag (FLAG1) to be equal to 0, and allows the high-frequency operation HF2 to be performed. Thereafter, the control circuit 3C allows a square-wave operation FB2 to be performed. In Step S11, the control circuit 3C waits for several milliseconds in a state of this square-wave operation FB2.

In subsequent Step S12, the control circuit 3C determines one more time whether or not the discharge lamp La is lighted. In a similar way to Step S6, also in this Step S12, the control circuit 3C determines that the discharge lamp La is lighted if the voltage V1a of the capacitor C1 is equal to or less than the predetermined threshold value (defined as Vth), and determines that the discharge lamp La is not lighted if the voltage V1a exceeds the threshold value.

In the case where it is determined that the discharge lamp La is lighted, then in Step S13, the control circuit 3C sets the lighting flag (FLAG1) to be equal to 1, sets the lighting history flag (FLAG2) to be equal to 1, and waits for several milliseconds. Thereafter, in Step S14, the control circuit 3C determines whether or not a predetermined period T has elapsed.

In the case where it is determined in Step S12 that the discharge lamp La is not lighted, then in Step S15, the lighting flag (FLAG1) is set to be equal to 0, and in Step S16, it is determined by the control circuit 3C whether or not the predetermined time T has elapsed. In the case where the discharge lamp La is not lighted and it is determined in Step S16 that the predetermined time T has not elapsed, the processing returns to the high-frequency operation HF1 of Step S3. Then, the high-frequency and high-voltage pulse is generated one more time by the control circuit 3C, and the discharge lamp La is allowed to cause a dielectric breakdown.

Meanwhile, in the case where it is determined in Step S16 that the predetermined period T has elapsed, then in Step S17, it is determined by the control circuit 3C that the lighting history flag (FLAG2) is equal to 1. By the control circuit 3C, it is determined whether or not there is a lighting history in which the discharge lamp La has been lighted at least once since the discharge lamp lighting device was started.

In the case where it is determined that the lighting history flag is equal to 1 and the discharge lamp La has been lighted at least once, then in Step S18, it is determined by the control circuit 3C whether or not a predetermined time T2 has elapsed. This predetermined time T2 is a period to which an extended time T' as an extended period shown in FIG. 3 is added. In the case where this predetermined time T2 has not elapsed, the processing is returned to Step S2, and in the case where the predetermined time T2 has elapsed, the processing is advanced to Step S19. Meanwhile, in the case where it is determined in Step S17 that the lighting history flag is not equal to 1, the processing is advanced to Step S19.

In Step S19, usual square-wave and low-frequency lighting is started by the control circuit 3C, and then the processing is ended.

Moreover, in accordance with the discharge lamp lighting device, the discharge lamp lighting device is composed in such a manner as described above, whereby the high-frequency operations HG in Step S9 and Step S3 are stopped in the case where it is determined in Step S6 and Step S12 that the discharge lamp La is lighted. Accordingly, a tube current can be prevented from being restricted by the resonant inductor L2, and startability of the discharge lamp La can be enhanced.

Specifically, in the case where it is determined that the discharge lamp La is lighted as a result of performing the high-frequency operation HF1 of Step S3, the square-wave operation FB1 (time t1 to t2) of Step S4, the high-frequency operation HF2 (from time t2) of Step S9 and the square-wave operation FB2 (until time t3) of Step S10 as shown in FIG. 3, the high-frequency operation is stopped by extending the square-wave operation FB2 in Step S13. Here, as shown in a change of the lamp voltage of FIG. 3, in the case where the discharge lamp La is not lighted, the lamp voltage reaches a high value (VH), and when the discharge lamp La is lighted, the lamp voltage falls to a low value (VL).

Moreover, in the case where it is determined that the discharge lamp La is lighted as a result of detecting the lighting state of the discharge lamp La by the starting detection circuit 5 during the periods of the square-wave operations FB, the periods of the square-wave operations FB are extended. For example, in the case where it is determined that the discharge lamp La is lighted at the time of the square-wave operations FB1 in each of which the switching elements Q2 and Q5 are turned on and the switching elements Q3 and Q4 are turned off, the periods of the square-wave operations FB1 are extended approximately several times. Specifically, at a time t6 and a time t8 in FIG. 3, the control circuit 3C controls the switching elements Q2 to Q5 to continue the square-wave operations FB1.

In a similar way to the above, also in the case where it is determined that the discharge lamp La is lighted at the time of the square-wave operations FB2 in each of which the switching elements Q2 and Q5 are turned off and the switching elements Q3 and Q4 are turned on, the periods of the square-wave operations FB2 are extended approximately several times. Specifically, at a time t3 and a time t5, the control circuit 3C controls the switching elements Q2 to Q5 to continue the square-wave operations FB2.

As described above, the discharge lamp lighting device is composed so that the square-wave operations FB1 and FB2 can be extended in the case where it is determined that the discharge lamp La is lighted. In such a way, electrodes of the discharge lamp La can be warmed sufficiently, whereby an effect that the discharge lamp La is surely lighted can be obtained. Moreover, the square-wave operations FB1 and FB2 are extended like from the time t5, the time t6 and the time t8 in FIG. 3, whereby the periods while the discharge lamp La is being lighted can be extended. Although naturally, the lamp voltage during the extended periods is changed between low voltage values (VL, VL').

The above-described operations are repeated for the predetermined period T from such activation of the discharge lamp lighting device, and then are shifted to the usual square-wave and low-frequency lighting after the elapse of the predetermined time T. However, in the case where the starting of the discharge lamp La has been detected (FLAG2=1) at least once as a result of determining the value of the lighting history flag (FLAG2) (Step S17), the predetermined period T is extended to T2 (>T) (Step S18). Such extension is performed for the purpose of increasing the number of repetitions of the period while the high frequency voltage and the square wave voltage are being outputted alternately. This period is shown from a time t9 to a time t10 in FIG. 3.

The high voltage is generated continuously in a state (no load state) where the discharge lamp La is not mounted; however, this is not preferable in terms of safety. Therefore, in general, it is usual that the generation period of the high voltage is restricted to approximately 1 second or less. However, in the case where the generation period of the high voltage is a period as short as approximately 1 second, there is a possibility that the discharge lamp La may be faded after elapse of 1 second even it the discharge lamp La is lighted once. Therefore, there is a case where the startability of the discharge lamp La cannot be ensured.

Accordingly, in the event of determining that the discharge lamp La is lighted as a result of determining whether or not the discharge lamp La is lighted (Steps S6, S12), the lighting history flag; FLAG2 is set at 1 by the control circuit 3C, and the state where the lighting history flag (FLAG2) is equal to 1 is held thereby. Thereafter, after determining that the predetermined period T has elapsed (Step S16), it is determined in Step S17 whether the lighting history flag (FLAG2) is 0 or 1. As a result, if the lighting history flag (FLAG2) is equal to 0, then it is regarded that the discharge lamp La is not lighted at all, and the generation of the high voltage is immediately stopped. At this time, if the lighting history flag (FLAG2) is equal to 1, then it is determined that the discharge lamp La has been lighted at least once, and the processing is returned to Step S2 after performing the operation of Step S18, whereby the high voltage generation period is extended. Specifically, timing of such extension is the time t9 of FIG. 3. In this embodiment, as an example, the high voltage generation period is extended to the predetermined period T2 that is several to several hundred times the predetermined period T.

The discharge lamp lighting device is composed in such a manner as described above. In such a way, even in the case where the electrodes of the discharge lamp La are not warmed sufficiently and the discharge lamp La is faded, the high voltage is generated during the extended predetermined period T2, and accordingly, the discharge lamp La can be started one more time, and better startability is obtained. Moreover, in the case where the discharge lamp La is not mounted, the high voltage generation is stopped after the elapse of the predetermined period T that is relatively short. Accordingly, the discharge lamp lighting device of this embodiment is preferable also from a viewpoint of the safety.

Note that, in the above-described configuration, the lighting state of the discharge lamp La is detected by the starting detection circuit 5 at the time of the square-wave operation, and in the case where it is determined that the discharge lamp La is lighted, the high-frequency operation is stopped. However, a similar effect is obtained even if, in place of this configuration, the discharge lamp lighting device is composed so that, not the high-frequency operation is stopped, but the high-frequency operation can be allowed while lowering the frequency than that at the time of the usual high-frequency operation HF1 or HF2. Although a specific flowchart is not shown, a high-frequency operation HF1' with a frequency lower than that of the high-frequency operation HF1 just needs to be executed in place of skipping the high-frequency operation HF1 by shifting from Step S6 to Step S7 in the control flow of FIG. 2. Alternatively, a high-frequency operation HF2' with a frequency lower than that of the high-frequency operation HF2 just needs to be executed in place of skipping the high-frequency operation HF2 by shifting from Step S12 to Step S13.

Second Embodiment

Next, a description is made of a discharge lamp lighting device according to a second embodiment to which the present invention is applied. Note that a circuit configuration of the discharge lamp lighting device according to the second embodiment is similar to that of the first embodiment, and accordingly, a description thereof is omitted. Moreover, a detailed description of similar portions to those of the above-mentioned first embodiment is omitted.

Figure 4:
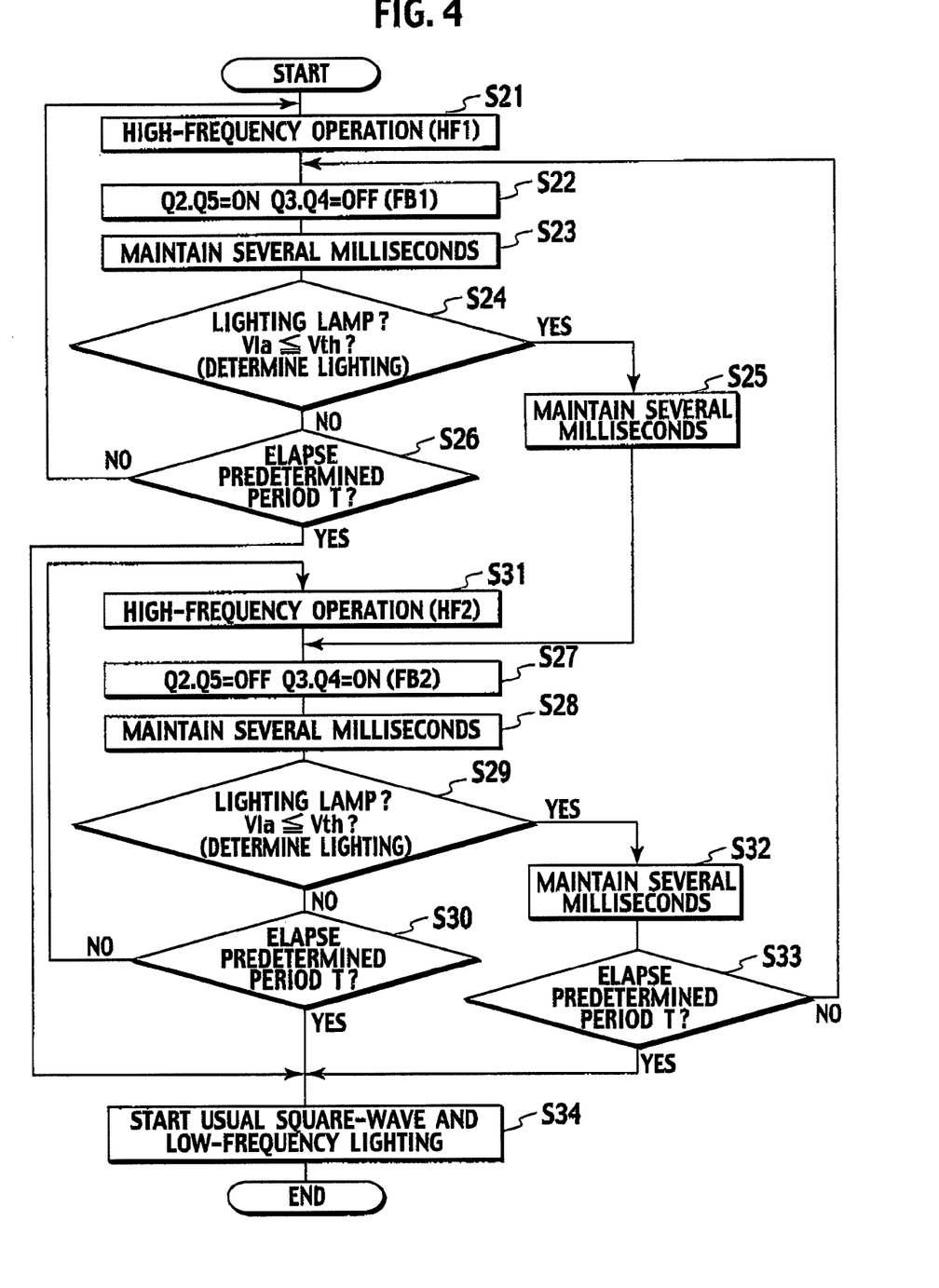
FIG. 4 is a flowchart showing operations of a second embodiment of the present invention.
Figure 5:
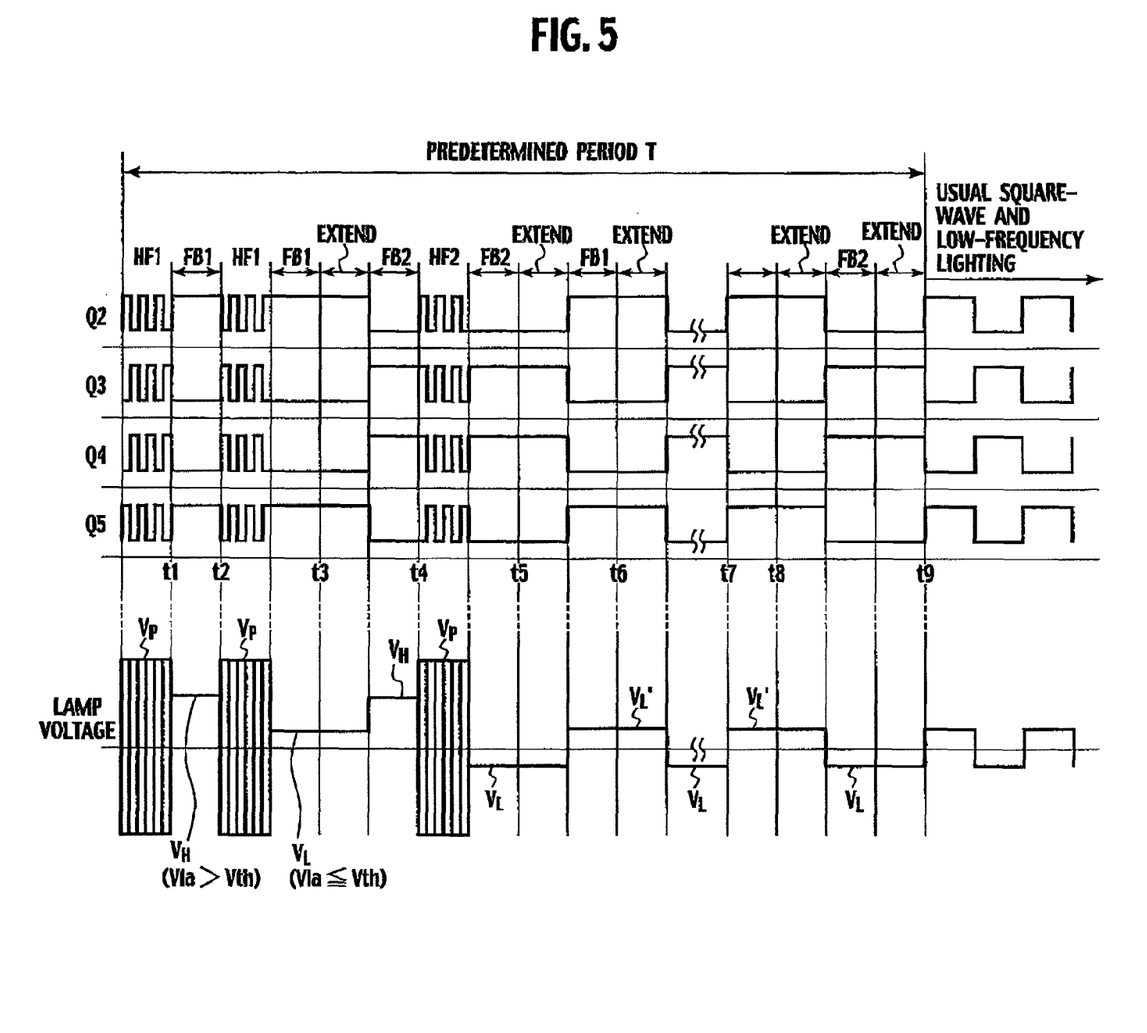
FIG. 5 is a waveform chart for explaining the operations of the second embodiment of the present invention.

FIG. 4 shows a control flowchart showing operations of main portions of the second embodiment, and FIG. 5 shows waveforms of operations of switching elements Q2 to Q5 and a waveform of a lamp voltage.

Although the controls by the lighting flag (FLAG1) and the lighting history flag FLAG2 are not shown in FIG. 4, the processing shown in Step S7, Step S13, Step S17 and Step S18, which are shown in FIG. 2, is performed. Specifically, also in this embodiment, in the case where it is determined that the discharge lamp La has been lighted at least once during the predetermined period T as in the first embodiment, the predetermined time T is extended to T2 (>T). In such a way, the number of repetitions of the period while the high frequency voltage and the square wave voltage are being outputted alternately is increased. Specifically, when it is determined at least once that the discharge lamp La has been lighted in a determination for the lighting, which is shown in Step S24 of FIG. 4, or in a determination for the lighting, which is shown in Step S29 thereof, then the predetermined period T just needs to be overwritten by T2 (>T).

In the above-mentioned first embodiment, in the case where it is determined that the discharge lamp La is not lighted during the period of the square-wave operation FB1, the processing proceeds to the square-wave operation FB2 after passing through the high-frequency operation HF2. Moreover, in the case where it is determined that the discharge lamp La is not lighted during the period of the square-wave operation FB2, the processing proceeds to the square-wave operation FB2 after passing through the high-frequency operation HF1. However, in this embodiment, as shown in FIG. 4, in Step S24 after performing the high-frequency operation HF1 and the square-wave operation FB1 by Step S21 to Step S23, it is determined whether or not the discharge lamp La is not lighted during the period of the square-wave operation FB1. Then, in the case where it is determined that the discharge lamp La is not lighted, the processing returns to Step S21, and proceeds to the square-wave operation FB1 after passing through the high-frequency operation HF1.

Moreover, after it is determined in Step S24 that the discharge lamp La is lighted, the processing proceeds to the square-wave operation FB2 of Step S27. After the square-wave operation FB2 of Step S27 is performed and waiting is performed for a predetermined time, then in Step S29, it is determined one more time whether or not the discharge lamp La is not lighted. In the case where it is determined in Step S29 that the discharge lamp La is not lighted, only when it is determined in Step S30 that the predetermined time T has not elapsed, the processing proceeds one more time to the square-wave operation FB2 of Step S27 after passing through the high-frequency operation HF2 of Step S31.

The discharge lamp lighting device is composed in such a manner as described above, whereby, in the case where the discharge lamp La is not lighted, the square wave is outputted one more time to a polarity that is not lighted, and accordingly, the discharge lamp La can be started rapidly. Specifically, in the case where it is determined that the discharge lamp La is not lighted when the current is flown in a certain polarity direction of the discharge lamp La, the current is supplied in the same polarity direction one more time after the processing passes through the high-frequency operation.

Specifically, as shown in FIG. 5, the high-frequency operation HF1 is first performed (Step S21) from the activation of the discharge lamp lighting device to the time t1, and then the square-wave operation FB1 (Steps S22, S23) is performed. Since the discharge lamp La is not lighted (Step S24) at the time t2 when the square-wave operation FB1 is ended, the high-frequency operation HF1 (Step S21) and the square-wave operation FB1 (Steps S22, S23) are performed one more time. As a result, in the case where it is detected at the time t3 that the discharge lamp La is lighted (Step S24), the square-wave operation FB1 concerned is extended (Step S25). Thereafter, when, at the time t4, it is determined one more time that the discharge lamp La is not lighted (Step S29), the high-frequency operation HF2 (Step S31) and the square-wave operation FB2 (Steps S27, S28) are performed from the time t4 concerned. Thereafter, in the case where the discharge lamp La is lighted (Step S29), the processing proceeds to the square-wave operation FB1 of Step S22 after continuing the square-wave operation FB2.

In each of the above-described respective embodiments, the starting detection circuit 5 of the discharge lamp La detects a tube voltage; however, the tube current may be detected. Moreover, though the DC/DC converter 2 is composed of the step-down chopper circuit, the DC/DC converter 2 can also be composed of a step-up chopper circuit or a flyback buck-boost converter as also described in Japanese Patent Laid-Open Publication No. 2004-265707. Moreover, though the discharge lamp lighting device has a configuration in which the DC/DC converter and the DC/AC inverter are independent of each other, the discharge lamp lighting device can also be composed of a full bridge circuit or a half bridge circuit, in which both thereof are combined with each other.

Third Embodiment

The discharge lamp lighting device described in either of the first embodiment and the second embodiment can be used by being built in a light fixture having the discharge lamp La attached thereonto, or can be used as an external stabilizer provided separately from such a light fitting. Moreover, a light system in which a light output is controlled in response to a sensor output may be composed by combining the light fixture as described above with a passive sensor or a brightness sensor. Furthermore, a light system in which the light output is controlled in response to a time span may be composed by combining the light fixture with a timer. Still further, the discharge lamp lighting device may be utilized for a projection-type image display apparatus or a vehicle headlamp lighting apparatus, which uses the high-intensity discharge lamp La as a light source.

INDUSTRIAL APPLICABILITY

In accordance with the present invention, there can be provided the discharge lamp lighting device that, at the time of starting the discharge lamp, alternately repeats the period while the high frequency voltage is being outputted by the resonant operation and the period while the square wave voltage is being outputted, wherein dielectric breakdown performance and arc transition performance, which are two important factors regarding the starting of the high-intensity discharge lamp, are optimized, and the sure starting is enabled. Moreover, a setting is made so that the number of repetitions of the period while the high frequency voltage and the square wave voltage are being outputted alternately can be increased in the case where the starting of the discharge lamp has been detected at least once. Accordingly, the discharge lamp can be started one more time. Hence, the discharge lamp is suppressed from being faded since the electrodes of the discharge lamp are not warmed sufficiently, and better startability is obtained. Moreover, in the case where the discharge lamp is not mounted, the high voltage generation is stopped in a relatively short time, and accordingly, the discharge lamp according to the present invention is preferable also from the viewpoint of the safety.

The invention claimed is:

1. A discharge lamp lighting device that includes:
    a DC/DC converter that converts a power supply voltage of a direct-current power supply into a desired current voltage;
    a smoothing capacitor that smoothes an output of the direct current voltage from the DC/DC converter;
    a DC/AC inverter that converts, into an alternating current voltage, the direct current voltage smoothed by the smoothing capacitor; and
    a starting circuit that has a resonant circuit composed of at least one capacitor and at least one inductor and supplies an output of the DC/AC inverter to a discharge lamp,
    in which, at a time of starting the discharge lamp, the discharge lamp lighting device alternately repeats a period while a high frequency voltage is being outputted, in which the resonant circuit performs a resonant operation, and a period while a square wave voltage is being outputted, and at a time of lighting the discharge lamp, applies a low-frequency square wave voltage to the discharge lamp through the starting circuit,
    the discharge lamp lighting device comprising:
    starting detection unit for detecting the starting of the discharge lamp during the period while the square wave voltage is being outputted; and
    control unit for stopping the high frequency voltage or lowering a frequency of the high frequency voltage when the starting of the discharge lamp is detected,
    wherein the control unit provides a setting so that a number of repetitions of a period while the high frequency voltage and the square wave voltage are being outputted is alternately being increased when the starting of the discharge lamp has been detected at least once.

2. The discharge lamp lighting device according to claim 1, wherein the control unit extends the period while the square wave voltage is being outputted when the starting of the discharge lamp is detected during the period while the square wave voltage is being outputted.

3. The discharge lamp lighting device according to claim 1, wherein, when the discharge lamp is not lighted during the period while the square wave voltage is being outputted, the control unit outputs the square wave voltage to a same polarity side as a polarity side at which it is determined that the discharge lamp is not lighted after the high frequency voltage is generated.

4. A light fixture comprising:
the discharge lamp lighting device according to claim 1,
wherein the discharge lamp lighting device is mounted on the light fixture.

5. The discharge lamp lighting device according to claim 2, wherein, when the discharge lamp is not lighted during the period while the square wave voltage is being outputted, the control unit outputs the square wave voltage to a same polarity side as a polarity side at which it is determined that the discharge lamp is not lighted after the high frequency voltage is generated.

6. A light fixture comprising:
the discharge lamp lighting device according to claim 2,
wherein the discharge lamp lighting device is mounted on the light fixture.

7. A light fixture comprising:
the discharge lamp lighting device according to claim 3,
wherein the discharge lamp lighting device is mounted on the light fixture.

8. A light fixture comprising:
the discharge lamp lighting device according to claim 5,
wherein the discharge lamp lighting device is mounted on the light fixture.

* * * * *